Figure 1:
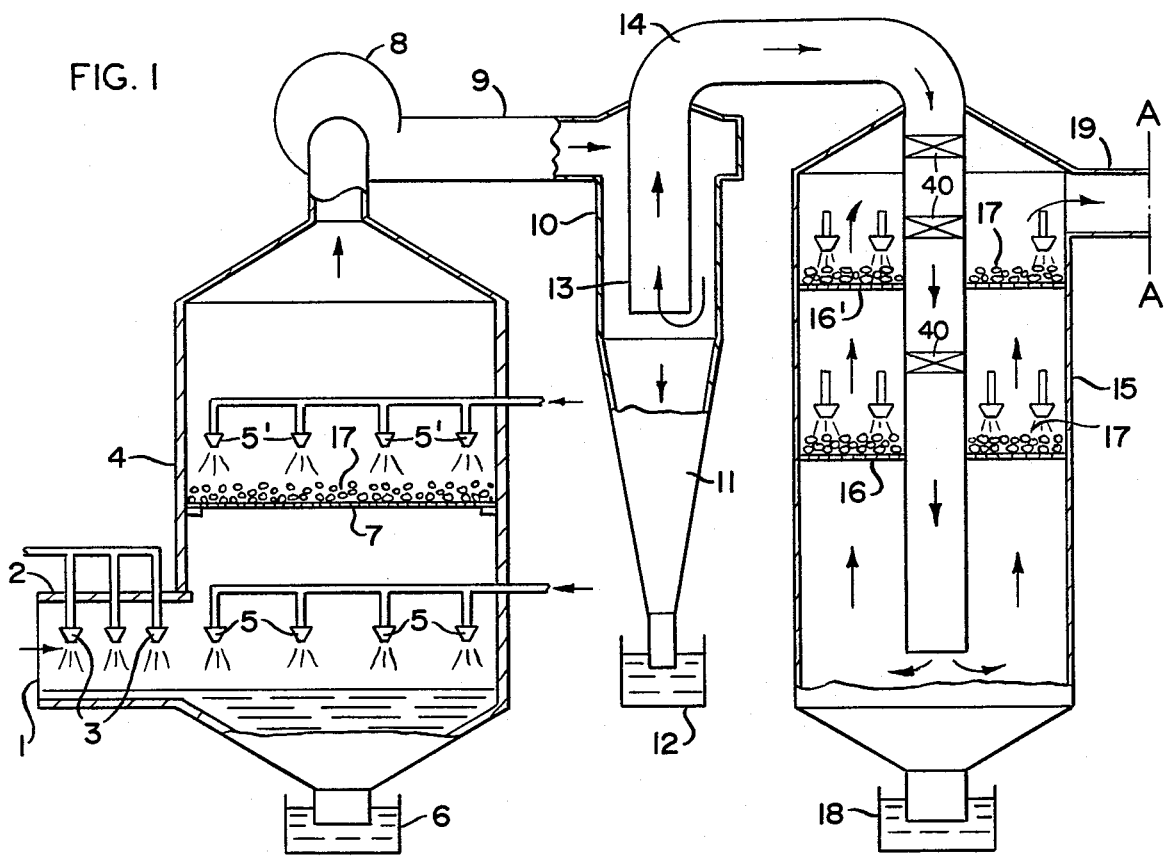

United States Patent [19]

Cold et al.

[11] 4,110,088
[45] Aug. 29, 1978

[54] APPARATUS AND METHOD FOR REMOVAL OF POLLUTANTS FROM FLUE GAS

[76] Inventors: David M. Cold, 18610 Hanna Rd., Lutz, Fla. 33549; Larry A. Bean, 100 Irwin St., Safety Harbor, Fla. 33572

[21] Appl. No.: 697,622

[22] Filed: Jun. 18, 1976

[51] Int. Cl.² ............................................. B01D 50/00
[52] U.S. Cl. .......................................... 55/90; 55/94; 55/233; 55/238; 55/257 QV; 55/257 C; 55/315; 55/446; 55/467; 55/DIG. 30; 261/17; 261/22; 261/DIG. 9
[58] Field of Search ...................... 261/DIG. 9, 22, 17; 55/93, 94, 223, 233, 238, 84, 257 QV, 257 C, 267, 342, 315, 467, 257 R, 90, 446, DIG. 30

[56] References Cited
U.S. PATENT DOCUMENTS

| | | | |
|---|---|---|---|
| 1,593,310 | 7/1926 | Robinson | 261/DIG. 9 X |
| 2,858,903 | 11/1958 | Goetz et al. | 261/DIG. 9 X |
| 3,011,966 | 12/1961 | Jahnentz et al. | 55/93 X |
| 3,348,825 | 10/1967 | McIlvaine | 55/257 C X |
| 3,404,512 | 10/1968 | Tomany | 261/22 X |
| 3,432,153 | 3/1969 | Drum | 261/DIG. 9 X |
| 3,456,439 | 7/1969 | Hale | 55/315 X |
| 3,572,264 | 3/1971 | Mercer | 55/233 X |
| 3,581,469 | 6/1971 | Davis et al. | 55/315 X |
| 3,619,985 | 11/1971 | Rohr | 55/93 X |

*Primary Examiner*—Frank W. Lutter
*Assistant Examiner*—Kathleen J. Prunner
*Attorney, Agent, or Firm*—Stein & Frijouf

[57] ABSTRACT

The apparatus and method described herein comprises a sequence and arrangement of equipment and the method of operation thereof for the removal of water soluble pollutants and particulate matter from flue gases, such as those emanating from incinerators, furnaces, electric power generating stacks, etc. The apparatus comprises a prequench chamber leading the exhaust gas from a stack into a spray chamber operating under a negative pressure of 3 to 4 inches of water as induced by a fan or pump at the exit end of the spray chamber with the said fan inducing a positive pressure of 3 to 4 inches of water into the conduit leading the gases from the spray chamber to a cyclone separator in which most of the water entrained in the gas at that point together with wetted particulate matter is removed, following which the gas is fed to the bottom of a partially packed tower whereby impinging contact of the gas with the packing removes final traces of particulate matter, and then the gas is passed into a demister in which the gas impinges on a series of plates or surfaces arranged at various angles for removal of final traces of water droplets. The gas exiting from the demister is passed into a fan or pump which gives the gas at the exit of the pump a positive pressure of 6–8 inches of water to force the gas through a venturi which feeds into a stack partially open at the bottom to allow for suction of air into admixture with the exit gas thereby further cooling the gas and simultaneously dehumidifying the gas so that it exits from the top of the stack as an invisible, clean gas.

6 Claims, 2 Drawing Figures

APPARATUS AND METHOD FOR REMOVAL OF POLLUTANTS FROM FLUE GAS

BACKGROUND OF THE INVENTION

1. Field of the Invention

This invention relates to an arrangement of apparatus and a method for removing pollutants from flue gases, such as the flue gas emanating from the stack of a municipal incinerator. More specifically, it relates to a method of operating such equipment under conditions which permit efficient removal of pollutants from flue gases at relatively low cost to produce an invisible, non-polluting effluent.

2. State of the Prior Art

Numerous attempts have been made and are being made to remove pollutants from the various flue gases which pollute the atmosphere. Various devices and processes have been devised for this purpose. These include wet scrubbing, electrostatic precipitators, venturi type scrubbers. However these methods tend to be either inefficient or expensive when handling large volumes of flue gas and all result in visible emissions.

It is an objective of this invention to provide a method of removing pollutants from flue gas by employing a system comprising a series of devices which are basic in design to reduce cost. It is an objective of this invention to provide a method of removing polutants from flue gas by a system designed to provide the maximum efficiency at a minimum energy consumption and constructed in such a manner as to provide satisfactory corrosion protection. It is a particular objective of this invention to accomplish all the objectives described while reducing the total discharge of the flue gas to an invisible, non-polluting emission.

STATEMENT OF THE INVENTION

In accordance with the present invention an arrangement of apparatus and the operation thereof have been devised to produce a clean emission of flue gas together with minimizing the energy and cost of operating this equipment. In the arrangement and process of this invention the flue gas is first fed into a prequencher in which water spray reduces the temperature of the flue gas coming directly from the incinerator, furnace, boiler, etc. at a temperature of about 1700°–1900° F, generally about 1800° F, to a temperature of about 900°–1100° F, generally about 1000° F. The flue gas is then fed into the bottom of a scrubbing tower in which at least two levels of sprays cover the complete horizontal cross-section of the scrubber so that the flue gas passes through at least two levels of spray in its upward passage through the scrubber. At the exit from the scrubber the temperature of the gas has been reduced to about 150°–200° F. From the top of the scrubber the gas is fed into a fan or pump which creates a negative pressure of 3–4 inches of water in the scrubber thereby inducing a good rate of flow through the scrubber and a positive pressure of 3–4 inches of water on the downstream side of the fan or pump so that the gas is pushed through a conduit leading to the top of a cyclone separator.

In the cyclone separator the gas is propelled against the outer cylindrical wall and impinges thereon thereby aiding in the depositing of particulate matter and water droplets which fall into the lower portion, preferably conical, into which the collected liquid and particulate matter is allowed to exit. The downward flow of the gas is induced by the fact that the outlet from the cyclone separator is a pipe or conduit extending vertically along the axis of the cylindrical separator to a point in the lower region thereof at or near the point where the cylindrical wall joins the conical base of the separator. While the cyclone separator may be cylindrical through its full length, in which case the exit pipe extends at least below the midpoint of the height of the separator, it is generally preferred to use a conical bottom.

The pipe or conduit receiving the exit gas from the cyclone separator leads to the bottom of a tower which is at least partially packed, preferably with two or more shelves or layers of a packing material on which the gas is impinged to aid in the deposition of water droplets and any remaining traces of particulate material. In the conduit leading into this tower there may be vanes, baffles, swirlers 40, etc. to give a swirling effect to the path of the gas thereby increasing the impingement of the gas onto the walls of the conduit, thereby enhancing the deposition of droplets and particles thereon. The packing is advantageously of a type and the overall packing is of sufficient overall depth to provide adequate impingement surface for deposition of final traces of particulate matter and of additional water droplets while at the same time not offering too great a pressure through the bed or beds as to severely impede the rate of flow of gas through the tower.

The gas exiting from the tower is then fed into one or more demisters for final removal of water droplets or mist that may still be suspended in the gas. The demisters offer a number of baffles which reverse the direction of flow of the gas a sufficient number of times to cause effective impingement and deposition of the final traces of water droplets from the gas.

The exit from the demister feeds the gas into a second fan or pump which aids in drawing the gas through the demister or demisters at a negative pressure, advantageously about minus 6–8 inches of water and then forces the demisted gas through a venturi which propels the cleaned gas into a vertical stack which is at least partially open at the bottom so that the jet of gas propelled into the stack sucks air into the stack through the opening at the bottom. The air at ambient temperature dilutes the gas and simultaneously dehumidifies the gas so that the emission at the top is invisible and free of pollutants.

Further description of the invention is facilitated by reference to the drawing.

Figure 1A:
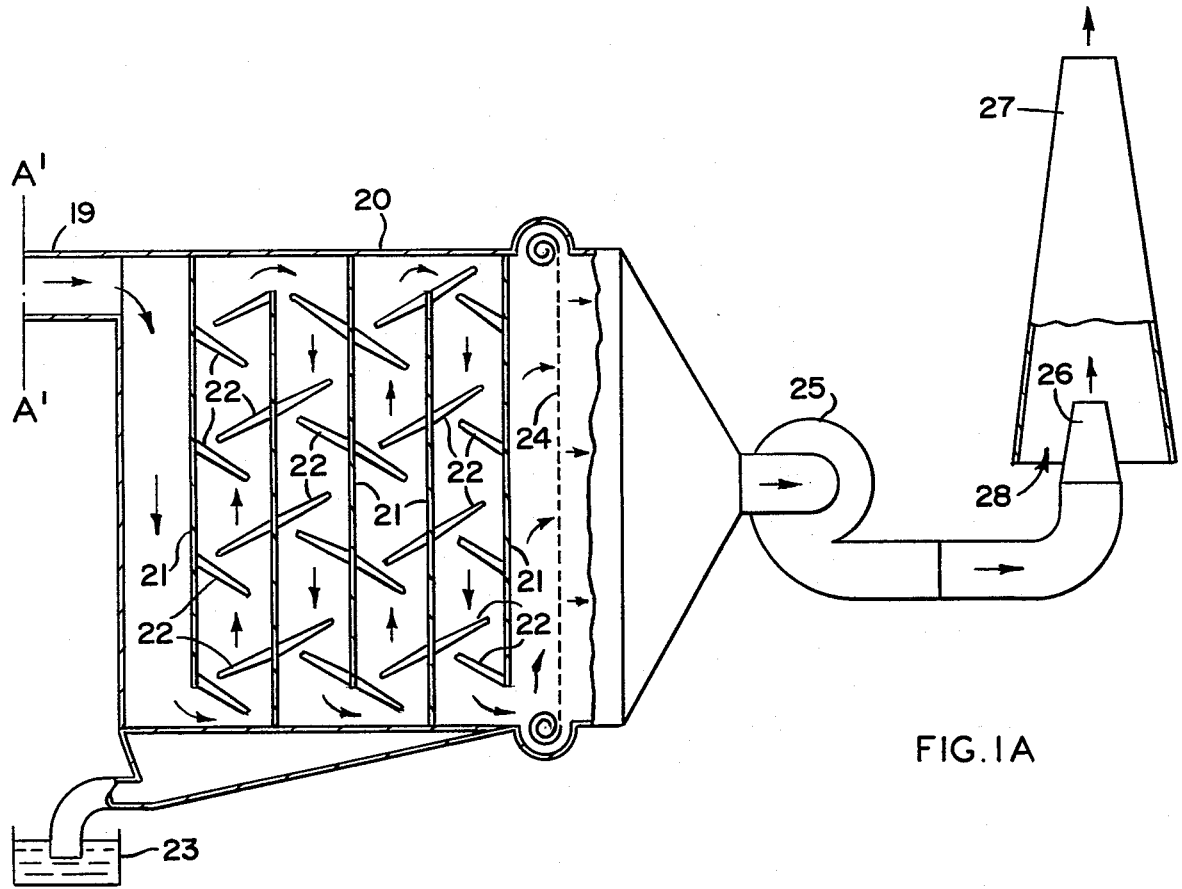

FIGS. 1 and 1A show a schematic view of a sequence of the apparatus of this invention. FIG. 1 shows the inlet 1 through which stack gas or flue gas from an incinerator, furnace, etc. is fed into prequencher 2 where a series of sprays 3 lower the temperature of the flue gas from about 1700°–1900° F to about 900°–1100° F. The spray heads are advantageously located near the top of the prequencher so as to contact most of the gas with water spray. Then the gas passes into the primary spray chamber or tower 4 wherein there are at least two levels of sprayheads 5 and 5' which deliver water spray to further cool the flue gas, absorb soluble pollutants and wet and aid in the removal of particulate materials. The water from the sprays together with the particulate matter deposited from the gas collects at the bottom of the tower and exits through the trap 6. The level of water in the trap is maintained at a sufficient height to prevent escape of gas through the trap. It is generally preferred in order to have efficient gas-water contact to have a porous or perforated tray 7 located between the two series of sprays 5 and 5' on which tray a packing material 17, such as 1 inch stone, Raschig rings, Tellerette packing, etc. is placed to a height of about 1-6 inches over which water from sprays 5' runs to the bottom of the tower and comes into intimate contact with the flue gas rising to the top of the tower. A fan or pump 8 is positioned at the top of the tower so that the flue gas exiting from the tower is given a positive pressure of 3-4 inches of water on the downstream side of the pump and likewise induces a corresponding negative pressure in the tower to produce a rapid rate of gas flow through the scrubbing tower.

The conduit 9 feeds the flue gas, which is now at about 150°-200° F to the inlet of cyclone separator 10 where it is given a circular path because of the direction of flow along the cylindrical interior surface of the cyclone separator. This creates a centrifugal force which impinges water and particulate matter on the surface of the separator thereby inducing deposition of the same on the inner wall, followed by the sweeping and falling of the water and particulate matter to the bottom 11 of the separator which is preferably conical in shape and leads to a trap 12 from which the collected water and particulate matter is removed. However, a sufficient height of water is maintained in the trap to prevent the escape of gas through the trap.

The cooled flue gas is forced in a spiral, downward direction because of the centrifugal force and because the outlet 13 is located at a point substantially below the inlet of the separator. The gas exits from the cyclone separator through conduit 14 which feeds the gas to the bottom of partially packed tower 15 which has at least two porous or perforated trays 16 and 16' on which a packing material 17 is placed advantageously to a height of 1-2 inches. This packing material again may be of stones ½-2 inches in diameter, preferably about 1 inch, Raschig rings, Tellerettes, and other well-known packing materials. This packing offers a surface against which water droplets and particulate matter are impinged, thereby inducing deposition. A series of sprayheads are located above the trays 16 and 16'. Water runs down from the packing carrying particulate matter with it to the trap 18 from which water and particulate matter are removed, with a sufficient head of water being maintained in the trap to prevent escape of gas therethrough.

The cleaned gas exits from the top of the packed tower 15 through conduit 19 which leads the gas to demister 20 wherein the gas passes around a number of baffle plates 21 having vanes 22 thereon which cause a torturous path to be given to the gas flow, thereby inducing impingement of the gas and de-entrainment such as mist, with resultant deposition of water thereon which falls to the bottom and collects in trap 23 from whence it is removed while maintaining a sufficient head of water to prevent the escape of gas therefrom.

The gas eventually passes through screen 24 and exits through fan or pump 25 which exerts a negative pressure to induce flow through the demister with a gas pressure 6-10 inches of water at the downstream side of the pump so that the gas is forced through venturi 26 which feeds the gas into stack 27 which has an opening 28 at the bottom which sucks air into the stack due to the aspirating effect caused by the venturi. As the gas and air mix while rising in the stack, the gas is dehumidified to such a degree that the mixture emitted into the atmosphere at the top of the stack is invisible and pollutant-free. The size of stack 27 is relative to the volume of gas being treated.

While a prequencher is shown and preferred as a separator apparatus preliminary to the feeding of the flue gas to the scrubbing tower, it may also be a preliminary section of the scrubbing tower, in which case the scrubbing tower may be made slightly larger to also perform this prequenching function prior to and in addition to its own scrubbing functions.

The size of the various pieces of equipment or apparatus used in this invention will depend on the amount or volume of flue gas to be treated. This volume of flue gas will obviously be determined by the amount of material being burned, whether it is trash, garbage, heating fuel, etc., and also by the amount of excess air fed to the incinerator or furnace. Excess air is generally fed to the incinerator or furnace to insure complete combustion. This excess may vary from 50% to 150%. However the excess is generally only about 50% since larger amounts necessitate the treatment of larger volumes of flue gas whereas 50% excess air is generally sufficient to insure substantially complete combustion.

The relative sizes of the various pieces of equipment are related to the linear velocities required or desired in the system.

The primary cooling chamber 4 is designed for 73,000 ACFM with a diameter of about 14 feet and a height of about 20 feet. The velocity of gas through this unit is about 2 feet per second.

The gas is delivered from the first pump into the cyclone separator 10 at a rate of about 100 feet per second with the discharge rate from the separator being about 80-90 feet per second. The rate of flow through the semipacked tower 15 and the demister 20 is about 2 feet per second. These units are of appropriate size to accommodate the rate of flow of gas. A semipacked tower of 14 feet diameter is appropriate for this purpose.

The temperature of the flue gas entering the prequencher is about 1800° and is about 1000° F when the gas enters the primary spray chamber. By the time the gas leaves the cyclone separator the gas has been cooled to 150°-160° F; at the exit of the semipacked tower 15 the temperature is about 130°-140° F and at the exit from the demister 20 the temperature is about 100°-110° F. At the top of the stack the gas is emitted to the atmosphere at 85°-100° F.

After passing through the primary spray chamber the gas has a moisture content of about 34 percent by volume and a gas content on a moisture-free or dry basis of 7.9% CO2, 0.0% CO, 11.7% $O_2$ and 78.9% $N_2$. Thus the $CO_2$ content has already been reduced from 9.17% to 7.9%, and the CO from 0.15% to 0.0% on a dry basis. Moreover, the solids content is reduced from the original 0.60-0.80 to about 0.196 grams/SCF.

At the exit of the cyclone separator the solids content is 0.13-0.10 grains/SCF and the moisture content is about 22%.

In a typical incinerator operation using 50% excess air, the flue gas comprises on a volume basis:
 6.25% $CO_2$
 8.00% $O_2$
 0.10% CO
 53.65% $N_2$
 32.00% $H_2O$
On a moisture-free basis this same gas will comprise:
 9.17% $CO_2$
 11.78% $O_2$ 0.15% CO
78.90% N$_2$ In such a flue gas there is generally about 0.60 to 0.80 grains of solid particles per standard cubic foot of flue gas. A typical composition of these solids is in 5 grains/SCF and contains primarily carbon with very small amounts or traces of compounds of the following metals:

0.019 Potassium
0.05 Sodium
0.01 Lead
0.0004 Iron
0.024 Zinc
0.00003 Manganese
0.0021 Magnesium
0.0073 Calcium In a typical combination of apparatus of this invention as shown in FIGS. 1 and 1A for treating the flue gas from a municipal incinerator burning about 250 tons of trash on a typical day, the equipment is designed to treat 68,000–73,000 ACFM, or 40,000 to 45,000 SCFM of flue gas. In the prequencher 2 the gas is treated with about 0.008 gallons of water per cubic foot of gas. The size of this preliminary spray chamber or prequencher 2 has a cross-sectional area of about 60 square feet and the velocity of the gas passing through this chamber is about 20 feet per second.

At the exit of the demister the solids content is 0.06–0.05 gr/SCF and the moisture content is about 15%.

With the second pump feeding the gas into venturi at a positive pressure of 10 inches of water and the openings at the bottom of the stack such that 2 volumes of air are sucked into the stack per volume of flue gas, the gas emitted from the top of the stack, the above typical example of operation of this system is very effective in removing the pollutants from flue gas to produce an invisible clean gas for emission into the atmosphere.

The solids from the various outlets or traps in this equipment may be collected and used for any suitable useful purpose or discarded. The collected water may be filtered and recycled to the various spray units.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

What the invention is:

1. A combination of apparatus for the removal of pollutants from flue gas comprising:
    (a) a prequencher embodying a series of water sprays adapted to impart a water spray for preliminary cooling and quenching of hot flue gas passing therethrough, said prequencher having an inlet adapted to receive said flue gas and an exit for said flue gas;
    (b) a primary spray chamber having two series of sprayheads, each series being adapted to spray water through the entire horizontal cross-sectional area of said chamber with one series of sprayheads being positioned vertically above the second series, said chamber having an inlet means for receiving prequenched flue gas from said prequencher and and outlet means;
    (c) a first pump positioned at and communicating with the outlet means of said chamber and adapted to provide a negative pressure in said primary spray chamber thereby to induce gas flow in said chamber and to provide a positive pressure on the downstream side of said pump;
    (d) a first conduit means connected to the downstream side of said first pump;
    (e) a cyclone separator having an inlet connected to said first conduit means and designed to induce centrifugal force and a downward path in the flow of gas therethrough, said separator having a bottom adapted to receive water and particulate matter depositing out of said gas and adapted to exit such material without releasing the gas pressure maintained therein, and said separator having an exit for the gas flowing therethrough, said exit being positioned at a point substantially lower than the inlet to said separator;
    (f) a second conduit means for leading exit gas from said cyclone separator;
    (g) a partially packed tower having a gas inlet means near the bottom thereof communicating with said second conduit means and adapted to receive said exit gas from said cyclone separator in a lower region of said partially packed tower, said tower having a gas outlet means in an upward region of said tower and having at least two porous trays vertically interposed between said gas inlet means and said gas outlet means and each said tray occupying the entire cross-sectional horizontal area of said tower so that said gas passes through the pores of said trays, and each said tray having a layer of packing thereon having a height of at least one inch,
    (h) a demister having a gas inlet means communicating with and adapted to receive exit gas from said tower, said demister comprising a closed compartment having a gas outlet means remote from said gas inlet means and having interposed between said gas inlet means and said gas outlet means a series of baffle plates adapted to cause the gas passing therethrough to reverse direction a number of times thereby to induce repeated impingement of said gas on the baffles and walls of said compartment and said demister having a means for removing water and particulate matter collected at the bottom of said compartment without releasing gas pressure in said compartment;
    (i) a second pump positioned at and communicating with said demister gas outlet means and thereby adapted to receive gas exiting from said outlet means and to impart a positive pressure on the downstream side of said pump and also to induce gas flow from the upstream side into said demister;
    (j) a third conduit means communicating with the downstream side of said second pump;
    (k) a venturi connected to and communicating with said third conduit and adapted to receive gas from the downstream side of said pump, said venturi having an outlet means and adapted to deliver gas through said outlet means at a much greater linear velocity than the linear velocity at which said gas enters said venturi; and
    (l) a vertical stack positioned above said venturi and adapted to receive gas exiting from said venturi, said stack having an opening therein adjacent to said venturi outlet with said opening adapted to have air drawn into said stack by virtue of the aspirating effect of the velocity of gas emanating from said venturi.

2. The apparatus of claim 1 wherein said spray chamber (b) has positioned between said two horizontally arranged series of sprayheads a porous tray occupying the entire horizontal cross-section of said tower and having on said porous tray a layer of at least one inch thickness of a packing material.

3. The apparatus of claim 1 wherein cyclone separator (e) has a conical bottom.

4. The apparatus of claim 1 wherein the said baffle plates in said demister each have a plurality of vanes thereon adapted to further reverse the direction of gas flowing through said demister.

5. A process for the removal of pollutants from a flue gas comprising the steps of:
(a) prequenching said gas with water spray to lower the temperature of said gas;
(b) passing said gas into a primary spray chamber wherein said gas is passed vertically upward through two series of sprays covering the entire horizontal cross-section of said chamber;
(c) pumping the gas exiting from said chamber to a cyclone separator in which said gas is increased in linear velocity and given a centrifugal, downward direction to enhance impingement of entrained particles and droplets onto the surface of said separator;
(d) passing the gas emanating from said separator into a lower region of a partially packed tower having at least two porous trays each covering the entire horizontal cross-sectional area of said tower and having a layer of at least one inch of a porous packing material and also having a series of sprays above said two trays so that said gas passes upward through said porous trays and comes into contact with spray water passing downward through said porous trays;
(e) passing said gas from an upper region of said partially packed tower into a demister comprising a compartment having a series of baffle plates positioned between the gas inlet and outlet to said compartment and adapted to cause repeated change in direction to the gas flow therethrough;
(f) pumping the gas from said demister to deliver said gas through a venturi at an increased rate of linear velocity; and
(g) passing said gas from said venturi into a vertical stack, said stack having at least one opening therein positioned adjacent to the venturi feed therein and adapted to have air sucked into said stack by the rapid flow of gas from said venturi into said stack.

6. A combination of apparatus for the removal of pollutants from flue gas comprising:
(a) a prequencher embodying a series of water sprays adapted to impart a water spray for preliminary cooling and quenching of hot flue gas passing therethrough, said prequencher having an inlet adapted to receive said flue gas and an exit for said flue gas;
(b) a primary spray chamber having means to spray water through substantially the entire horizontal cross-sectional area of said chamber; said chamber having an inlet means for receiving prequenched flue gas from said prequencher and outlet means;
(c) a first pump positioned at and communicating with the outlet means of said primary spray chamber and adapted to provide a negative pressure in said primary spray chamber thereby to induce gas flow in said chamber and to provide a positive pressure on the downstream side of said pump;
(d) a first conduit means connected to the downstream side of said first pump;
(e) a cyclone separator having an inlet connected to said first conduit means and designed to induce centrifugal force in the flow of gas therethrough, said separator adapted to receive water and particulate matter depositing out of said gas and adapted to exit such material without releasing the gas pressure maintained therein, and said separator having an exit for the gas flowing therethrough;
(f) a second conduit means for leading exit gas from said cyclone separator;
(g) a partially packed tower having a gas inlet means connected to said second conduit means and adapted to receive said exit gas from said cyclone separator, said tower having a gas outlet means in said tower and having at least two porous trays interposed between said gas inlet means and said gas outlet means so that said gas passes through the pores of said trays, and each said tray having a layer of packing thereon;
(h) a demister having a gas inlet means communicating with and adapted to receive exit gas from said tower, said demister comprising a closed compartment having a gas outlet means remote from said gas inlet means and having interposed between said gas inlet means and said gas outlet means a series of baffle plates adapted to cause the gas passing therethrough to reverse direction a number of times thereby to induce repeated impingement of said gas on the baffles and walls of said compartment, and said demister having a means for removing water and particulate matter collected at the bottom of said compartment without releasing gas pressure in said compartment;
(i) a second pump positoned at and communicating with said demister gas outlet means and thereby adapted to receive gas exiting from said outlet means and to impart a positive pressure on the downstream side of said pump and also to induce gas flow from the upstream side into said demister;
(j) a third conduit means communicating with the downstream side of said second pump;
(k) a venturi connected to and communicating with said third conduit and adapted to receive gas from the downstream side of said pump, said venturi having an outlet means and adapted to deliver gas through said outlet means at a much greater linear velocity than the linear velocity at which said gas enters said venturi; and
(l) a vertical stack positioned above said venturi and adapted to receive gas exiting from said venturi, said stack having an opening therein adjacent to said venturi outlet with said opening adapted to have air drawn into said stack by virtue of the aspirating effect of the velocity of gas emanating from said venturi.

* * * * *